United States Patent [19]

Egli

[11] Patent Number: 4,662,409
[45] Date of Patent: May 5, 1987

[54] METHOD AND APPARATUS FOR FINE-DOSING BULK MATERIAL

[75] Inventor: Alwin Egli, Beringen, Switzerland

[73] Assignee: SIG Schweizerische Industrie-Gesellschaft, Neuhausen am Rheinfall, Switzerland

[21] Appl. No.: 731,956

[22] Filed: May 8, 1985

[30] Foreign Application Priority Data

May 9, 1984 [CH] Switzerland ............... 2271/84

[51] Int. Cl.$^4$ ............................................. B65B 1/34
[52] U.S. Cl. ........................................ 141/1; 141/83; 177/56
[58] Field of Search .................. 141/1, 83; 177/56

[56] References Cited

U.S. PATENT DOCUMENTS

| 3,557,889 | 1/1971 | Reisa ................... | 141/83 X |
| 3,805,689 | 4/1974 | Berger et al. ......... | 141/83 X |
| 4,226,691 | 5/1981 | Wolwowicz ........... | 141/83 X |
| 4,275,775 | 6/1981 | Egli ..................... | 141/83 |

FOREIGN PATENT DOCUMENTS 819807 7/1949 Fed. Rep. of Germany ........ 141/83
595241 2/1978 Switzerland .

Primary Examiner—Stephen Marcus
Assistant Examiner—Mark Thronson
Attorney, Agent, or Firm—Spencer & Frank

[57] ABSTRACT

A method of charging a package with dosed bulk material, includes the steps of filling the package in a pre-filling station to an extent less than a desired final weight; weighing the partially filled package; determining the difference between actual and desired weight of the package; advancing the partially filled package to an after-filling station; and filling the package in the after-filling station with additional bulk material having a weight corresponding to the determined weight difference. Metering of the additional bulk material and readying the additional bulk material for delivery into the package are started before the package assumes a charging position in the after-filling station.

7 Claims, 3 Drawing Figures

METHOD AND APPARATUS FOR FINE-DOSING BULK MATERIAL

BACKGROUND OF THE INVENTION

This invention relates to a method and an apparatus for fine-dosing flowable (bulk) material wherein a pre-dosed package is weighed, the quantity of the material missing from the package to obtain a desired weight is determined and the missing material is added to the package by a fine-dosing apparatus controlled by a control device. The fine-dosing (after-dosing) apparatus has a material conveying screw rotatable in a screw housing.

Swiss Pat. No. 595,241 discloses a fine-dosing apparatus for flowable material, particularly sugar, wherein the material quantities missing to obtain a desired weight are added to the only partially-filled package by a fine-dosing (after-dosing) apparatus. The fine-dosing apparatus has a vertically oriented dosing (metering) screw which advances the material and which is disposed in a funnel-shaped conveying hopper provided with a stirring device. The metering screw advances the material downwardly directly into the package to be complemented. The missing material quantities are determined previously by a scale and the metering screw is rotated until the package is filled to correspond to the desired weight.

SUMMARY OF THE INVENTION

It is an object of the invention to provide an improved method and apparatus of the above-outlined type with which the packaging output is significantly increased.

This object and others to become apparent as the specification progresses, are accomplished by the invention, according to which, briefly stated, during or subsequent to weighing the package pre-filled with one part of the material, the missing material is metered and placed in readiness in the fine-dosing apparatus. The apparatus according to the invention includes a metering screw having a longitudinal rotary axis oriented approximately horizontally and the screw housing opens into a dosing chamber.

The method and the apparatus according to the invention have the advantage that the fine-dosing may start as early as the measuring process and may be performed during the conveyance of the package from the scale to the fine-dosing apparatus, whereby significant time saving results and thus a significantly higher packing output may be ensured.

DESCRIPTION OF THE PREFERRED EMBODIMENT

Figure 1:
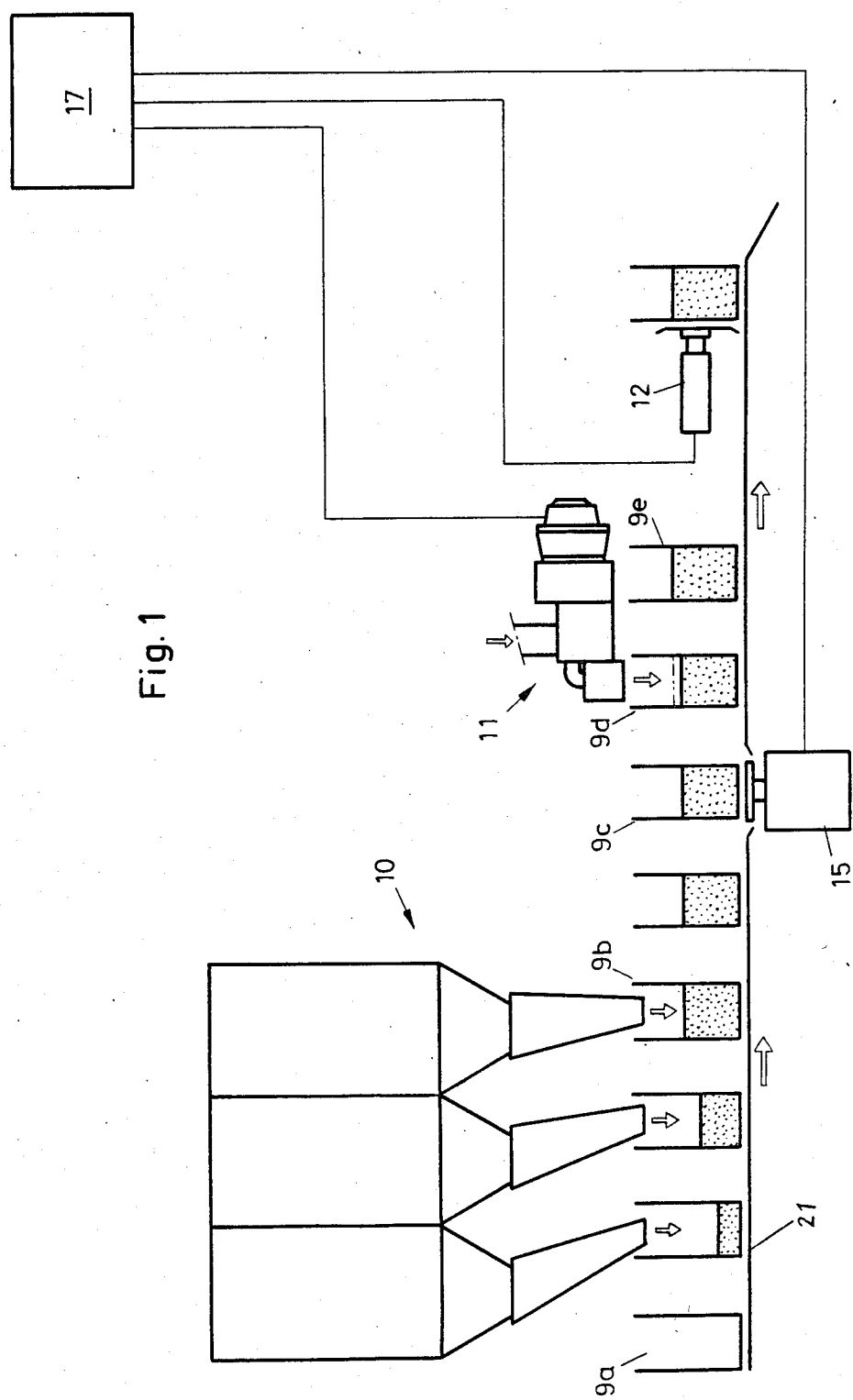
FIG. 1 is a schematic side elevational view of a preferred embodiment of the invention.

Turning to FIG. 1, there is illustrated therein a pre-dosing (coarse dosing) apparatus 10 of known construction, by means of which a predetermined preliminary quantity of flowable material is introduced into empty packages (one shown at 9a) advanced on a conveyor 21. The partially filled packages 9b, 9c are forwarded to a scale 15 where they are weighed in sequence to determine the difference between the actual weight and the desired weight. The scale 15 is connected with an after-dosing (fine-dosing) device 11 by means of a control apparatus 17 which has circuit components well known by themselves in the process control art. Based on the determined weight difference between actual and desired weights, the control apparatus 17 controls the after-dosing device 11 in such a manner that the latter readies, for the appropriate package, a material quantity corresponding to the weight difference. As the package associated with the prepared volume is aligned with the after-dosing device 11, the measured and standby material quantities are introduced. The packages 9d and 9e which are thus filled to the desired weight, are forwarded by an ejection device 12—also operatively coupled to the control apparatus 17—to a further processing station.

Figure 2:
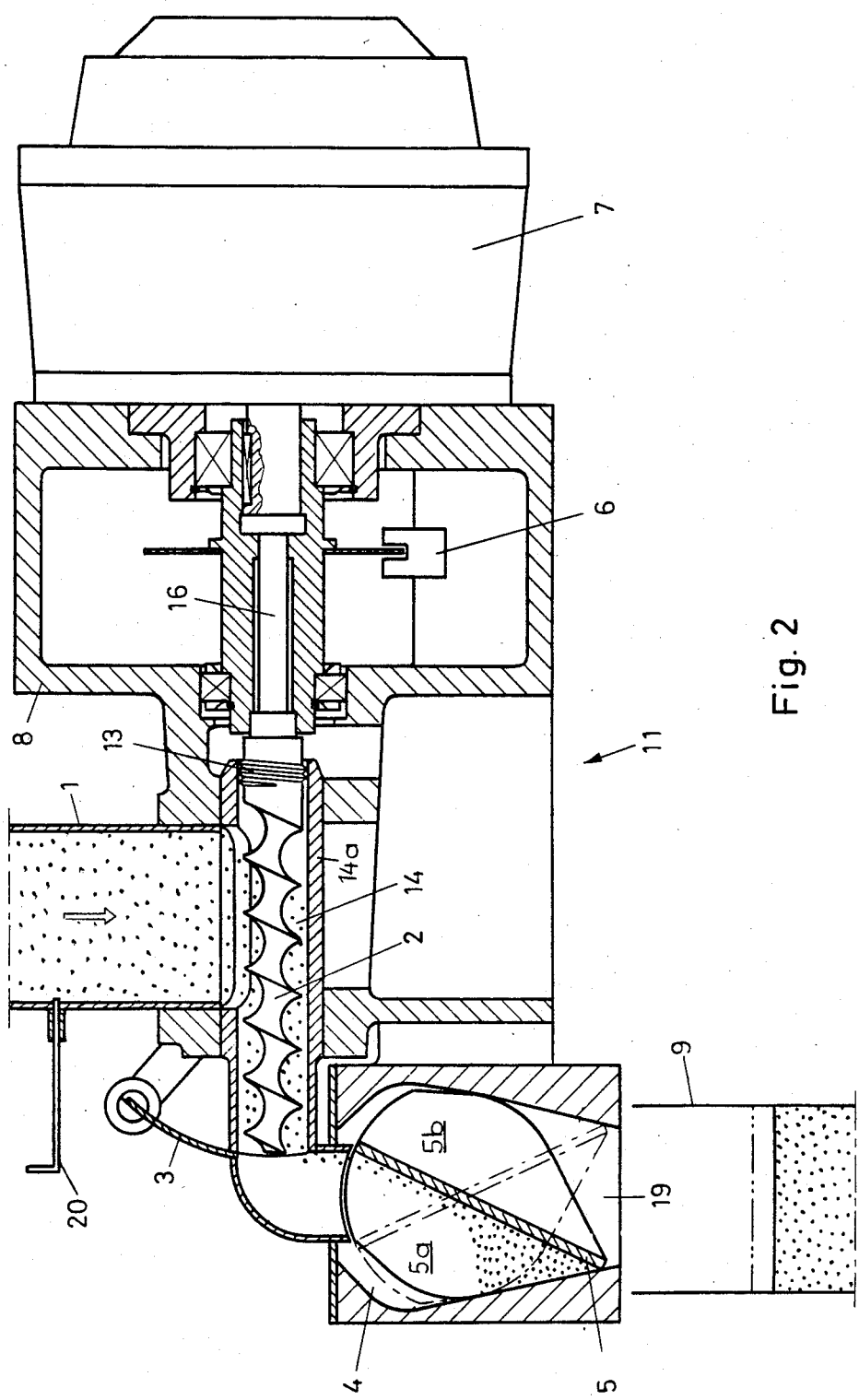
FIG. 2 is an enlarged sectional side elevational view of a detail of the preferred embodiment.

Turning now to FIG. 2, the construction shown therein comprises a housing 8 which accommodates a dosing screw 2 having a shaft 16 which is driven by a disc motor 7 having an rpm measuring device 6 of known construction. The dosing screw 2 has a longitudinal rotary axis which is horizontally oriented. The dosing screw 2 is accommodated in a horizontal conveying channel 14 defined by a screw housing sleeve 14a affixed to the housing 8. The conveying channel 14 opens at its discharge end into a dosing chamber 4. Above the transporting channel 14 there is arranged a vertically oriented supply chute 1 provided with a shut-off gate 20. A seal 13 provides a sealed passage for the screw 2 from the screw housing 14a to the motor 7. The discharge end of the conveyor channel 14 may be opened and closed at its discharge end by a transversely and arcuately slidable gate 3.

Figure 3:
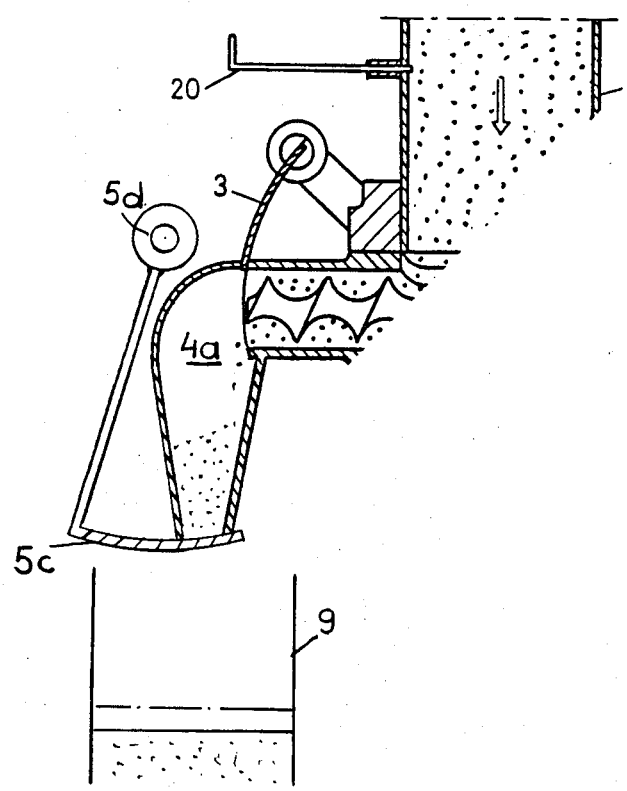
FIG. 3 is a fragmentary sectional side elevational view similar to FIG. 2, illustrating a variant component.

In the dosing chamber 4 there is situated a rotary dispenser gate 5 which may have side walls 5a and 5b. The gate 5 is rotatable about a horizontal axis back and forth through an angle of approximately 50° into two end positions. In the end position assumed by the dispenser gate 5 shown in solid lines, its lowermost edge is in engagement on the left with an inner side wall of the dosing chamber 4 and thus material advanced by the screw 2 may fall from the screw housing 14a into the space bounded by the dispenser gate 5 and its side walls 5a, without any material being dispensed yet from the dosing chamber 4. Upon command from the control apparatus 17, the dispenser gate 5 is rotated counter-clockwise into its other end position shown in broken lines. During this occurrence, the material previously accumulated by the dispenser gate 5 is promptly discharged from dosing chamber 4 through the outlet opening 19 by virtue of the lower edge of the gate 5 moving away from the chamber wall. In its other end position, the lowermost edge of the gate 5 engages the right hand side of the inner wall of the dosing chamber 4 and, for the next fine-dosing operation material may be accumulated by the gate 5 between its side walls 5b. It will be understood that as an alternative other types of dispensing gates may be used in the dosing chamber 4 for discharge therefrom through the chamber outlet opening. Thus, as shown in FIG. 3, the bottom outlet opening of the dosing chamber 4a is controlled by a gate 5c which is swingable between an illustrated closed position and an open position. The gate 5c is supported by pivot 5d externally of the dosing chamber 4a.

In the description which follows, the operation of the above-described apparatus will be set forth.

The empty package 9a is filled close to the desired weight by the pre-dosing device 10 and is advanced by the conveyor 21 to the scale 15 where the weight of the package 9c and the weight difference between the actual weight and the desired weight of the package are determined.

Based on the weight difference the control device 17 operates the after-dosing apparatus 11 in such a manner that the missing quantity from the package 9c is readied in the dosing chamber 4. Preferably, in case of a constant running time, the rpm of the conveying screw 2 is regulated as a function of the weight difference, the rpm being approximately proportional to such weight difference. Since it is not necessary to wait for the package to assume its correct position under the discharge opening 19 of the after-dosing device, the metering screw 2 may commence the delivery of the material to the dosing chamber 4 already during or upon conclusion of the measuring (weighing) process. After the missing material quantities have been readied in the dosing chamber 4, the channel 14 is closed off from the conveyor screw 2 by means of the transverse sliding gate 3. In this manner additional material is prevented from being introduced into the dosing chamber 4 from the channel 14. In a successive dosing process the channel 14 is again opened. As soon as the package 9d is positioned underneath the discharge opening 19 of the dosing chamber 4, the dispenser gate 5 is pivoted so that the material quantity readied in the dosing chamber 4 falls in its entirety into the package 9d and thus the consecutive operational cycle may begin.

It will be understood that the above description of the present invention is susceptible to various modifications, changes and adaptations, and the same are intended to be comprehended within the meaning and range of equivalents of the appended claims.

What is claimed is:

1. In a method of charging packages with dosed bulk material, including the step of filling each package in a pre-filling station to an extent less than a desired final weight; weighing each partially filled package; determining the difference between actual and desired weight of each package; and advancing each partially filled package to an after-filling station; the improvement comprising the following consecutive steps:
    (a) metering an additional bulk material with a dosing screw into a dosing chamber situated in said after-filling station; the additional bulk material having a weight-corresponding to the determined weight difference; said metering step being of constant duration for each package and bieng started before the respective package assumes a charging position in said after-filling station; said metering step comprising the step of regulating the rpm of said dosing screw as a function of the weight difference; and
    (b) filling the respective partially filled package in the after-filling station with the metered additonal bulk material by releasing the metered additonal bulk material from said dosing chamber.

2. A method as defined in claim 1, wherein the step of metering is started during the weighing step.

3. A method as defined in claim 1, wherein the step of metering is started upon conclusion of the weighing step.

4. In an apparatus for charging a package with dosed bulk material; including a pre-dosing apparatus arranged for filling a package with bulk material to an extent less than a predetermined desired weight; a weighing device arranged for weighing the package filled in the pre-dosing apparatus; a control apparatus connected to the weighing device and arranged for determining the difference between desired and actual weights of the package; an after-dosing apparatus connected to said control apparatus and arranged for introducing into the package bulk material of a weight corresponding to said difference; and means for advancing the package from said weighing device to a charging position in said after-dosing apparatus; the improvement wherein said after-dosing apparatus comprises
    (a) a screw housing defining an approximately horizontally oriented conveyor channel having an inlet end and an outlet end;
    (b) a conveyor screw accommodated in said conveyor channel and arranged for advancing bulk material, introduced in said conveyor channel at said inlet end, toward said outlet end and discharging the bulk material therefrom;
    (c) driving means for rotating said conveyor screw;
    (d) a dosing chamber connected to said outlet end of said conveyor channel for receiving bulk material therefrom; said dosing chamber having a discharge end;
    (e) a first openable and closable gating means cooperating with said discharge end of said dosing chamber for effecting accumulation of bulk material in said dosing chamber in a closed position of said gating means and for effecting discharge of the accumulated bulk material from the dosing chamber in an open position of said gating means;
    (f) a second openable and closable gating means co-operating with said outlet end of said conveyor channel for preventing bulk material from passing from said conveyor channel to said dosing chamber by closing off said conveyor channel from said dosing chamber in a closed position of said second openable and closable gating means; and
    (g) control means for starting operation of said driving means before the package reaches said charging position in said after-dosing apparatus for metering bulk material by the conveyor screw into said dosing chamber in said open position of said second openable and closable gating means and in a simultaneous closed position of said first openable and closable gating means; said control means forming part of said control apparatus.

5. An apparatus as defined in claim 4, wherein said first openable and closable gating means comprises an arcuately slidable gate.

6. An apparatus as defined in claim 4, wherein said first openable and closable gating means comprises a pivotal dispenser gate having a first end position in which a first part of said dosing chamber is open towards said outlet opening of said conveyor channel and closed toward said discharge end and a second part of said dosing chamber is closed toward said outlet opening of said conveyor channel and open toward said discharge end; said dispenser gate having a second end position in which said first part of said dosing chamber is closed toward said outlet opening of said conveyor channel and open toward said discharge end of said dosing chamber and said second part of said dosing chamber is open toward said outlet opening of said conveyor channel and closed toward said discharge end of said dosing chamber; said dispenser gate being arranged for back-and-forth pivotal motion between said first and second end positions.

7. An apparatus as defined in claim 4, wherein said second additional openable and closable gating means comprises an arcuately movable sliding gate.

* * * * *